(12) United States Patent
Choi et al.

(10) Patent No.: US 12,197,286 B2
(45) Date of Patent: Jan. 14, 2025

(54) APPARATUS AND METHOD FOR ADAPTIVE CHECKPOINT IN INTERMITTENT COMPUTING

(71) Applicant: ELECTRONICS AND TELECOMMUNICATIONS RESEARCH INSTITUTE, Daejeon (KR)

(72) Inventors: Jung-Sik Choi, Daejeon (KR); Young-Bin Kim, Daejeon (KR); Jin-Ah Shin, Daejeon (KR); Kwang-Yong Lee, Daejeon (KR); Yoo-Jin Lim, Daejeon (KR); Chae-Deok Lim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 18/098,418

(22) Filed: Jan. 18, 2023

(65) Prior Publication Data

US 2023/0393942 A1 Dec. 7, 2023

(30) Foreign Application Priority Data

Jun. 7, 2022 (KR) .................. 10-2022-0068852

(51) Int. Cl.
G06F 11/00 (2006.01)
G06F 11/14 (2006.01)
G06F 11/36 (2006.01)

(52) U.S. Cl.
CPC ...... *G06F 11/1407* (2013.01); *G06F 11/3612* (2013.01)

(58) Field of Classification Search
CPC .................. G06F 11/1407; G06F 11/3612
(Continued)

(56) References Cited

U.S. PATENT DOCUMENTS 9,740,562 B2 8/2017 Leibman et al.
2007/0300033 A1* 12/2007 Kano .................. G06F 3/0689
711/170

(Continued)

FOREIGN PATENT DOCUMENTS

KR 10-0875431 12/2008
KR 10-1881038 8/2018
(Continued)

OTHER PUBLICATIONS

Jongouk Choi et al., "Achieving Stagnation-Free Intermittent Computation with Boundary-Free Adaptive Execution," 2019 IEEE Real-Time and Embedded Technology and Applications Symposium, (Apr. 18, 2019).

*Primary Examiner* — Sarai E Butler
(74) *Attorney, Agent, or Firm* — KILE PARK REED & HOUTTEMAN PLLC (57) ABSTRACT

Disclosed herein are an apparatus and method for an adaptive checkpoint in intermittent computing. The apparatus for an adaptive checkpoint in intermittent computing includes memory in which at least one program is recorded and a processor for executing the program. The program may perform statically setting locations at which checkpoints are to be performed at compile time of program code and dynamically determining whether to perform the checkpoints depending on energy-harvesting conditions at runtime of the program code.

19 Claims, 6 Drawing Sheets

(58) Field of Classification Search
USPC .................................................... 714/1–57
See application file for complete search history.

(56) References Cited

U.S. PATENT DOCUMENTS

| | | | | |
|---|---|---|---|---|
| 2012/0011401 A1* | 1/2012 | Ranganathan | ...... | G06F 11/1484 |
| | | | | 714/E11.023 |
| 2014/0032884 A1* | 1/2014 | Krishna | ................ | G06F 9/3863 |
| | | | | 712/228 |
| 2015/0205671 A1 | 7/2015 | Bissett et al. | | |
| 2015/0277914 A1* | 10/2015 | Kelm | .................. | G06F 9/45516 |
| | | | | 712/226 |
| 2018/0167864 A1* | 6/2018 | Johnston | ................. | H04W 4/70 |
| 2018/0285241 A1* | 10/2018 | Lucia | .................. | G06F 11/3648 |
| 2021/0365092 A1* | 11/2021 | Ruppel | ............... | G06F 11/2051 |

FOREIGN PATENT DOCUMENTS

| | | |
|---|---|---|
| KR | 10-1903805 | 10/2018 |
| KR | 10-2019-0062870 | 6/2019 |

* cited by examiner

APPARATUS AND METHOD FOR ADAPTIVE CHECKPOINT IN INTERMITTENT COMPUTING

CROSS REFERENCE TO RELATED APPLICATION

This application claims the benefit of Korean Patent Application No. 10-2022-0068852, filed Jun. 7, 2022, which is hereby incorporated by reference in its entirety into this application.

BACKGROUND OF THE INVENTION

1. Technical Field

The disclosed embodiment relates to technology for performing a checkpoint in intermittent computing.

2. Description of the Related Art

Intermittent computing is a next-generation computing paradigm that enables data to be independently retained and enables a program to be continuously run even in the event of frequent power failures in unstable power-supply conditions in which power is acquired through energy harvesting without wall power or batteries. Intermittent computing is configured to repeat the process of performing recharging through energy harvesting when a power failure occurs and the process of resuming execution of the program when recharging is completed, thereby making the program progress.

In intermittent computing, the progress of a program is checkpointed during execution of the program in order to make the program progress even in the event of frequent power failures. The use of checkpointed data makes it possible to resume execution of the program from the most recent checkpoint, rather than re-executing the program from the beginning, even when the power fails.

Such checkpoint technology is broadly classified into a static checkpoint mechanism and a dynamic checkpoint mechanism.

In the static checkpoint mechanism, where to put a checkpoint is determined at compile time. The static checkpoint mechanism has an advantage in that it is easy to support an atomic execution region. However, once the locations of checkpoints are set, the checkpoints are always performed at the corresponding locations, which causes a large checkpoint overhead. Unnecessary checkpoints lead to a loss of a considerable amount of power and add an overhead that is fatal to the overall system performance. Therefore, technology capable of minimizing a checkpoint overhead is required.

Meanwhile, in the dynamic checkpoint mechanism, a checkpoint is dynamically performed when necessary. The dynamic checkpoint mechanism has an advantage in that a checkpoint overhead is significantly reduced, but additional devices for measuring power in real time are required.

Also, the dynamic checkpoint mechanism has a problem in which it is difficult to support an atomic execution region. For example, a checkpoint can be performed in the middle of a code block that is written by a programmer with the intention to atomically execute the code block. In this case, the code block may not be executed atomically. A code region intended to be executed atomically should be executed atomically. If the code region is not executed as originally intended, a corresponding program may produce erroneous results. For example, when atomic execution is not guaranteed, a transaction cannot be performed, and time consistency may be damaged. Accordingly, intermittent computing technology capable of ensuring atomic execution of a code region is required.

SUMMARY OF THE INVENTION

An object of the disclosed embodiment is to reduce power loss by minimizing an unnecessary checkpoint overhead in intermittent computing.

Another object of the disclosed embodiment is to perform a checkpoint without additional devices for measuring power in real time in intermittent computing.

A further object of the disclosed embodiment is to ensure atomic execution of a code region in intermittent computing.

An apparatus for an adaptive checkpoint in intermittent computing according to an embodiment includes memory in which at least one program is recorded and a processor for executing the program. The program may perform statically setting locations at which checkpoints are to be performed at compile time of program code and dynamically determining whether to perform each checkpoint depending on energy-harvesting conditions at runtime of the program code.

Here, when statically setting the locations at which checkpoints are to be performed, the program may set the locations at which checkpoints are to be performed to locations outside of an atomic section.

Here, when dynamically determining whether to perform each checkpoint, the program may determine checkpoints to be actually performed, among the checkpoints, the locations of which are set, while increasing the distance between the checkpoints to be actually performed.

Here, when dynamically determining whether to perform each checkpoint, the program may increase the distance between the checkpoints to be actually performed by 1 whenever a checkpoint succeeds.

Here, when dynamically determining whether to perform each checkpoint, the program may increase the distance between the checkpoints to be actually performed by a predetermined multiple of the distance whenever a checkpoint succeeds.

Here, when dynamically determining whether to perform each checkpoint, if the checkpoint is determined to be performed, the program may store temporary data in nonvolatile media in preparation for a power failure such that resumption at a current location is possible.

Here, when dynamically determining whether to perform each checkpoint, the program may increase the distance between the checkpoints to be actually performed until the distance becomes a preset target, but may decrease the distance between the checkpoints to be actually performed depending on current energy-harvesting conditions after power restoration if a power failure occurs before reaching a target checkpoint.

A method for an adaptive checkpoint in intermittent computing according to an embodiment may include statically setting locations at which checkpoints are to be performed at compile time of program code and dynamically determining whether to perform each checkpoint depending on energy-harvesting conditions at runtime of the program code.

Here, statically setting the locations at which checkpoints are to be performed may comprise setting the locations at which checkpoints are to be performed to locations outside of an atomic section.

Here, dynamically determining whether to perform each checkpoint may comprise determining checkpoints to be actually performed, among the checkpoints, the locations of which are set, while increasing the distance between the checkpoints to be actually performed.

Here, dynamically determining whether to perform each checkpoint may comprise increasing the distance between the checkpoints to be actually performed by 1 whenever a checkpoint succeeds.

Here, dynamically determining whether to perform each checkpoint may comprise increasing the distance between the checkpoints to be actually performed by a predetermined multiple of the distance whenever a checkpoint succeeds.

Here, dynamically determining whether to perform each checkpoint may comprise, when the checkpoint is determined to be performed, storing temporary data in nonvolatile media in preparation for a power failure such that resumption at a current locations is possible.

Here, dynamically determining whether to perform each checkpoint may comprise increasing the distance between the checkpoints to be actually performed until the distance becomes a preset target and decreasing the distance between the checkpoints to be actually performed depending on current energy-harvesting conditions after power restoration if a power failure occurs before reaching a target checkpoint.

An apparatus for an adaptive checkpoint in intermittent computing according to an embodiment includes memory in which at least one program is recorded and a processor for executing the program, and the program may perform dynamically determining whether to perform each checkpoint depending on energy-harvesting conditions at runtime of program code in which locations at which checkpoints are to be performed are specified.

Here, the locations at which checkpoints are to be performed may be locations outside of an atomic section.

Here, dynamically determining whether to perform each checkpoint may comprise determining checkpoints to be actually performed, among the checkpoints, the locations of which are set, while increasing the distance between the checkpoints to be actually performed.

Here, dynamically determining whether to perform each checkpoint may comprise, when the checkpoint is determined to be performed, storing temporary data in nonvolatile media in preparation for a power failure such that resumption at a current location is possible.

Here, dynamically determining whether to perform each checkpoint may comprise increasing the distance between the checkpoints to be actually performed until the distance becomes a preset target and decreasing the distance between the checkpoints to be actually performed depending on current energy-harvesting conditions after power restoration if a power failure occurs before reaching a target checkpoint.

BRIEF DESCRIPTION OF THE DRAWINGS

The above and other objects, features, and advantages of the present disclosure will be more clearly understood from the following detailed description taken in conjunction with the accompanying drawings, in which.

DESCRIPTION OF THE PREFERRED EMBODIMENTS

The advantages and features of the present disclosure and methods of achieving the same will be apparent from the exemplary embodiments to be described below in more detail with reference to the accompanying drawings. However, it should be noted that the present disclosure is not limited to the following exemplary embodiments, and may be implemented in various forms. Accordingly, the exemplary embodiments are provided only to disclose the present disclosure and to let those skilled in the art know the category of the present disclosure, and the present disclosure is to be defined based only on the claims. The same reference numerals or the same reference designators denote the same elements throughout the specification.

It will be understood that, although the terms "first," "second," etc. may be used herein to describe various elements, these elements are not intended to be limited by these terms. These terms are only used to distinguish one element from another element. For example, a first element discussed below could be referred to as a second element without departing from the technical spirit of the present disclosure.

The terms used herein are for the purpose of describing particular embodiments only, and are not intended to limit the present disclosure. As used herein, the singular forms are intended to include the plural forms as well, unless the context clearly indicates otherwise. It will be further understood that the terms "comprises," "comprising,", "includes" and/or "including," when used herein, specify the presence of stated features, integers, steps, operations, elements, and/or components, but do not preclude the presence or addition of one or more other features, integers, steps, operations, elements, components, and/or groups thereof.

Unless differently defined, all terms used herein, including technical or scientific terms, have the same meanings as terms generally understood by those skilled in the art to which the present disclosure pertains. Terms identical to those defined in generally used dictionaries should be interpreted as having meanings identical to contextual meanings of the related art, and are not to be interpreted as having ideal or excessively formal meanings unless they are definitively defined in the present specification.

Hereinafter, an apparatus and method for an adaptive checkpoint in intermittent computing according to an embodiment will be described in detail with reference to FIGS. 1 to 8.

Figure 1:
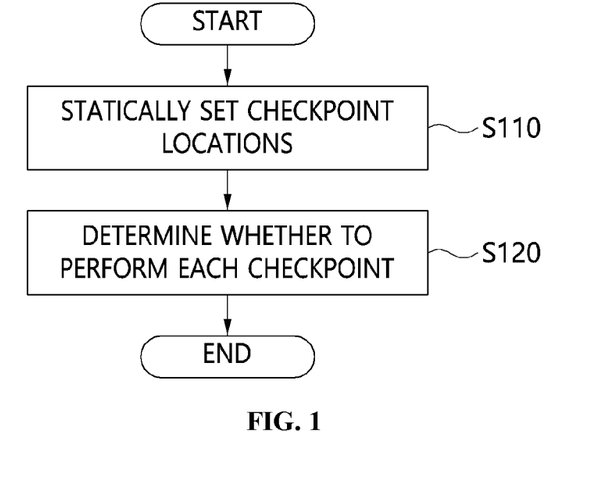
FIG. 1 is a flowchart for explaining a method for an adaptive checkpoint in intermittent computing according to an embodiment.

FIG. 1 is a flowchart for explaining a method for an adaptive checkpoint in intermittent computing according to an embodiment.

Referring to FIG. 1, the method for an adaptive checkpoint in intermittent computing according to an embodiment may include statically setting locations at which checkpoints are to be performed at compile time of program code at step S110 and dynamically determining whether to perform each checkpoint depending on energy-harvesting conditions at runtime of the program code at step S120.

Here, at the step (S110) of statically setting locations at which checkpoints are to be performed according to an embodiment, the locations of checkpoints may be set to locations outside of an atomic section.

Accordingly, no checkpoint is added in the atomic section set by a programmer in the embodiment, whereby the original meaning of a program may be preserved. A detailed description of step S110 will be made later with reference to FIG. 2.

Here, at the step (S120) of dynamically determining whether to perform each checkpoint according to an embodiment, performing the checkpoint at the checkpoint location may be skipped depending on the energy-harvesting conditions.

That is, the frequency of performing a checkpoint is dynamically adjusted depending on the energy-harvesting conditions in the embodiment. Under good energy-harvesting conditions, a checkpoint overhead may be minimized by skipping as many checkpoints as possible, but, under poor energy-harvesting conditions, checkpoints are frequently performed in preparation for a power failure. A detailed description of step S120 will be made later with reference to FIGS. 3 to 5.

Figure 2:
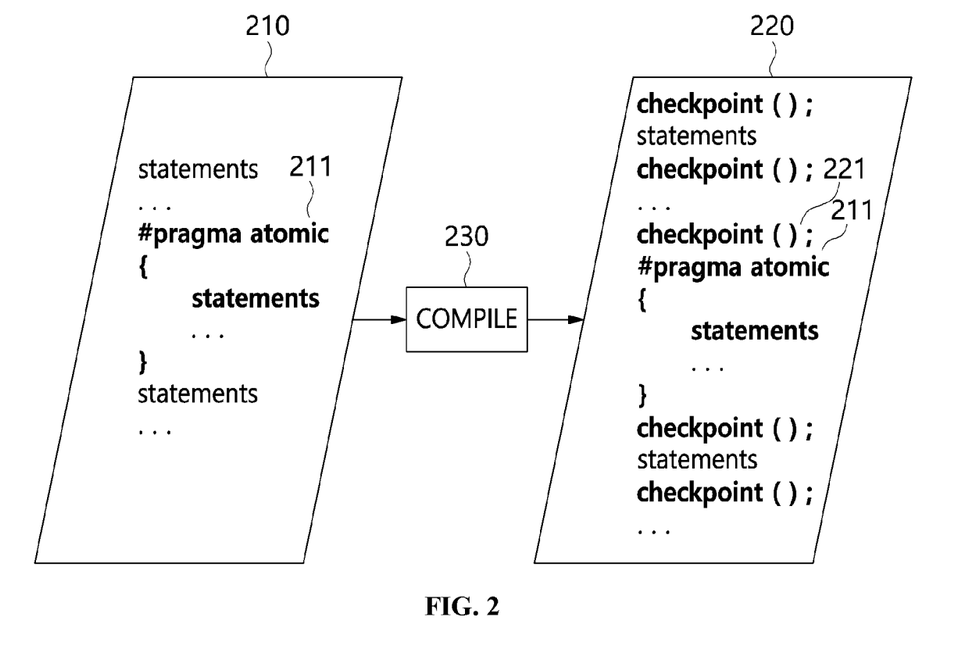
FIG. 2 is an exemplary view for explaining the step of statically setting locations at which checkpoints are to be performed at compile time of program code according to an embodiment.

FIG. 2 is an exemplary view for explaining the step (S110) of statically setting locations at which checkpoints are to be performed at compile time of program code according to an embodiment.

As described above, existing dynamic checkpoint techniques may damage the original meaning of a program. In an embodiment, an atomic section 211 may be specified in program source code 210 by a programmer, as shown in FIG. 2, in order to preserve the original meaning of the program.

Here, the atomic section may be specified using pragma grammar.

Subsequently, checkpoint locations may be statically set in the program code 210 at a compile step 230 according to an embodiment.

As shown in FIG. 2, checkpoint calls 221 are added at multiple locations in the compiled program code 220, but no checkpoint calls are added in the atomic section 211.

The existing static checkpoint techniques are focused on locating suitable checkpoint locations for efficiently performing checkpoints. For example, a checkpoint technique using idempotence may reduce a checkpoint overhead by minimizing the size of data to be checkpointed.

However, unlike the existing static checkpoint technique, the embodiment is configured such that checkpoint calls are added to be as closely spaced as possible, as described above. However, no checkpoint calls are added in the atomic section.

Figure 3:
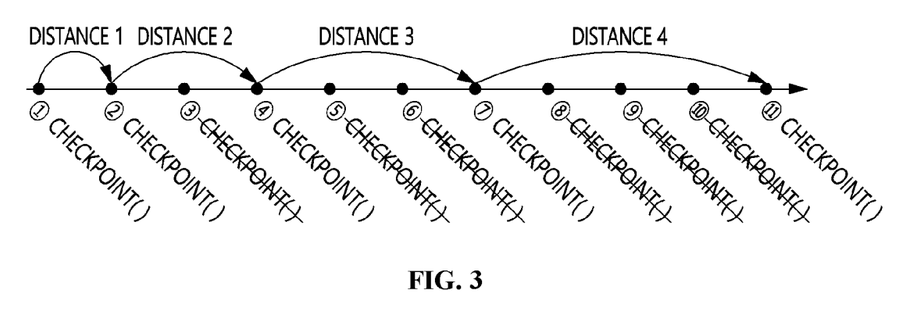
FIG. 3 is an exemplary view for explaining a skip of a checkpoint at the step of dynamically determining whether to perform each checkpoint depending on energy-harvesting conditions at runtime of program code according to an embodiment.

FIG. 3 is an exemplary view for explaining the skip of a checkpoint at the step (S120) of dynamically determining whether to perform each checkpoint depending on energy-harvesting conditions at runtime of program code according to an embodiment.

Referring to FIG. 3, the multiple checkpoint locations statically set at step S110 are spaced apart at predetermined time intervals.

In the existing static checkpoint technique, checkpoints are always performed at the checkpoint locations illustrated in FIG. 3, which causes a large checkpoint overhead.

However, in the embodiment, although the checkpoint locations are statically set, whether to perform each checkpoint is determined depending on the energy-harvesting conditions.

That is, referring to FIG. 3, checkpoints at ③, ⑤, ⑥, ⑧, ⑨, and ⑩ are skipped. As such, when checkpoints can be skipped because energy-harvesting conditions are good, as many checkpoints as possible are skipped, whereby a checkpoint overhead is minimized.

That is, according to an embodiment, all of checkpoint( ) functions, the locations of which are set at step S110, can be called, but whether to actually perform the checkpoint may be determined in each of checkpoint( ) functions.

In an embodiment, a variable 'distance', which indicates the distance between the checkpoints to be performed, may be used in order to determine whether to perform checkpoints.

As illustrated in FIG. 3, when the distance is 1, after checkpoint ① is performed, checkpoint ② is performed continuously.

However, when the distance is 2, after checkpoint ② is performed, checkpoint ③, which is the next checkpoint, is skipped, and checkpoint ④ is performed. Here, it can be seen that the distance between checkpoints ② and ④ that are performed is 2.

Also, when the distance is 3, after checkpoint ④ is performed, checkpoints ⑤ and ⑥ are skipped, and checkpoint ⑦ is performed. Here, it can be seen that the distance between checkpoints ④ and ⑦ that are performed is 3.

In FIG. 3, the value of 'distance' is increased whenever a checkpoint is performed. Here, when a number of checkpoints equal to the value of 'distance' are skipped and target checkpoints are completed, this means that sufficient power is generated through energy harvesting.

Accordingly, whenever a checkpoint succeeds, the value of 'distance' is increased, whereby more checkpoints are skipped.

FIG. 3 illustrates an example in which the value of 'distance' is increased by 1, but the present disclosure is not limited thereto. That is, the value of 'distance' may be increased in any of various manners depending on the situation, e.g., in a manner of increasing the value by 1.5 or two times.

However, when the power fails before reaching the target checkpoint, the value of 'distance' is decreased in the embodiment, whereby 'distance' may be adjusted to have a suitable value depending on the current energy-harvesting conditions.

Figure 4:
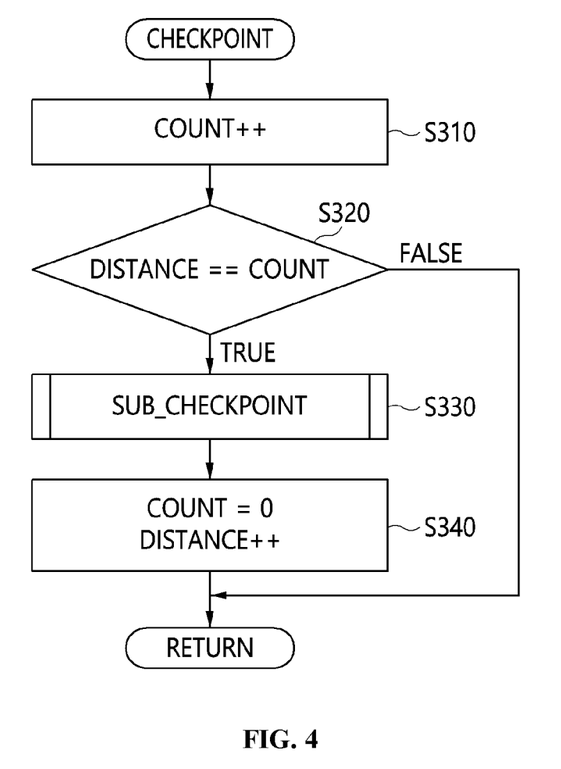
FIG. 4 is a flowchart for explaining the step of dynamically determining whether to perform each checkpoint according to an embodiment.

FIG. 4 is a flowchart for explaining the step (S120) of dynamically determining whether to perform each checkpoint according to an embodiment.

In FIG. 4, 'count' is a variable for storing the number of times checkpoint( ) function is called, and 'distance' is a variable indicating the distance between the checkpoints to be performed, as in FIG. 3.

Here, the number of checkpoints to be skipped may be (distance −1).

Here, 'count' and 'distance' may be initialized by init( ) function, which is executed when power is applied to a computing system.

Referring to FIG. 4, when checkpoint( ) function is called first, the variable 'count' is increased at step S310 in order to increase the number of times checkpoint( ) function is called.

Subsequently, whether the value of 'distance' is equal to the value of 'count' is determined at step S320.

When it is determined at step S320 that the value of 'distance' is equal to the value of 'count', which indicates that all of the checkpoints intended to be skipped are skipped, so a checkpoint task has to be performed now.

Accordingly, the checkpoint task is performed at step S330. Here, sub_checkpoint( ) subroutine, which performs the actual checkpoint task, is called, whereby the checkpoint may be performed.

Here, sub_checkpoint( ) subroutine performs a task for safely storing temporary data in nonvolatile media in preparation for a power failure such that resumption at the current location is possible.

Subsequently, when the checkpoint task is completed, the variable 'count' is initialized and the value of 'distance' is increased at step S340.

Meanwhile, when it is determined at step S320 that the value of 'distance' is not equal to the value of 'count', which indicates that a checkpoint to be skipped remains. In this case, the checkpoint task is skipped by bypassing steps S330 and S340.

Figure 5:
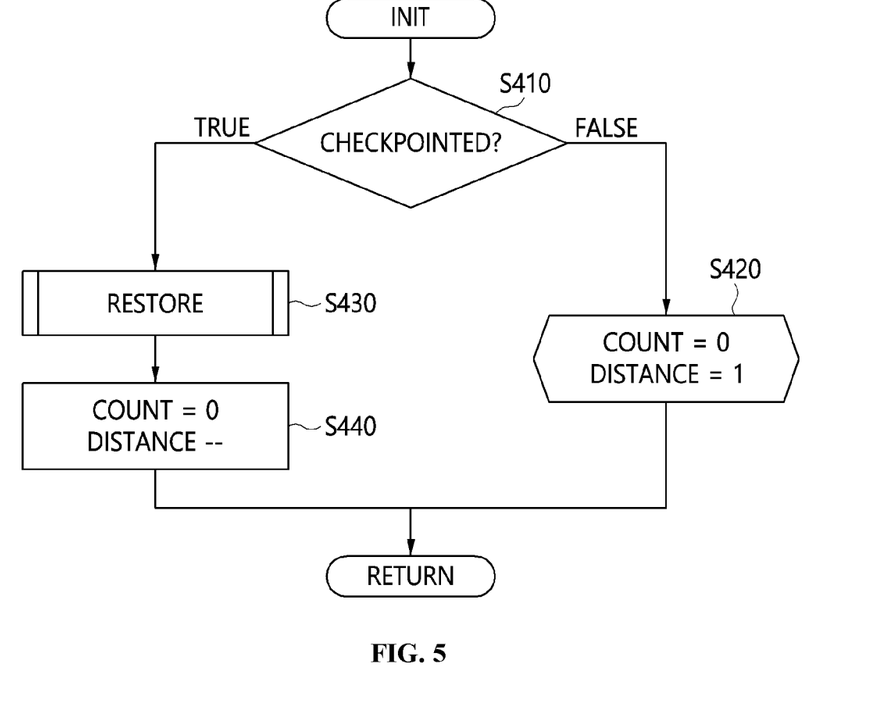
FIG. 5 is a flowchart for explaining an initialization operation after power is applied according to an embodiment.

FIG. 5 is a flowchart for explaining an initialization operation after power is applied according to an embodiment.

Referring to FIG. 5, when power is applied to an intermittent computing system, init( ) function is called for initialization.

Whether checkpointed data remains or the system is newly started may be checked at step S410.

When it is determined at step S410 that the system is newly started, the variable 'count' is initialized to '0' and the variable 'distance' is initialized to '1'.

Conversely, when it is determined at step S410 that checkpointed data remains, restore( ) subroutine is called at step S430. Here, restore( ) subroutine loads the checkpointed data into a register and main memory in order to resume a corresponding application.

When the restoration task is completed, the variable 'count' is initialized to 0, and the variable 'distance' is decreased at step S440. This is for setting a suitable distance because a power failure occurred before reaching a target distance.

In this example, the value of 'distance' is decreased by 1, but another method of decreasing the distance may be used depending on the situation.

Figure 6:
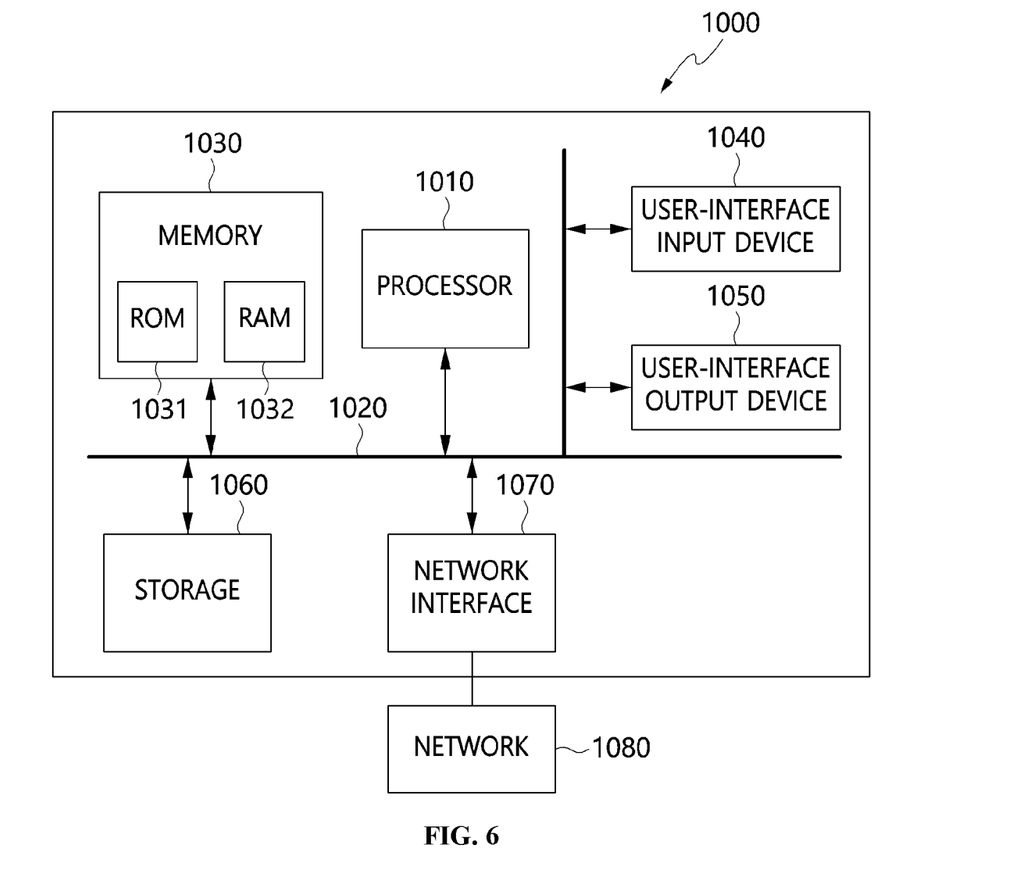
FIG. 6 is a view illustrating a computer system configuration according to an embodiment.

FIG. 6 is a view illustrating a computer system configuration according to an embodiment.

The apparatus for an adaptive checkpoint in intermittent computing according to an embodiment may be implemented in a computer system 1000 including a computer-readable recording medium.

The apparatus for an adaptive checkpoint in intermittent computing may perform the method for an adaptive checkpoint in intermittent computing, which is described above with reference to FIGS. 1 to 5.

The computer system 1000 may include one or more processors 1010, memory 1030, a user-interface input device 1040, a user-interface output device 1050, and storage 1060, which communicate with each other via a bus 1020. Also, the computer system 1000 may further include a network interface 1070 connected to a network 1080. The processor 1010 may be a central processing unit or a semiconductor device for executing a program or processing instructions stored in the memory 1030 or the storage 1060. The memory 1030 and the storage 1060 may be storage media including at least one of a volatile medium, a nonvolatile medium, a detachable medium, a non-detachable medium, a communication medium, or an information delivery medium, or a combination thereof. For example, the memory 1030 may include ROM 1031 or RAM 1032.

As described above, the embodiment relates to adaptive checkpoint technology for adjusting the frequency of performing checkpoints depending on energy-harvesting conditions in intermittent computing.

Figure 7:
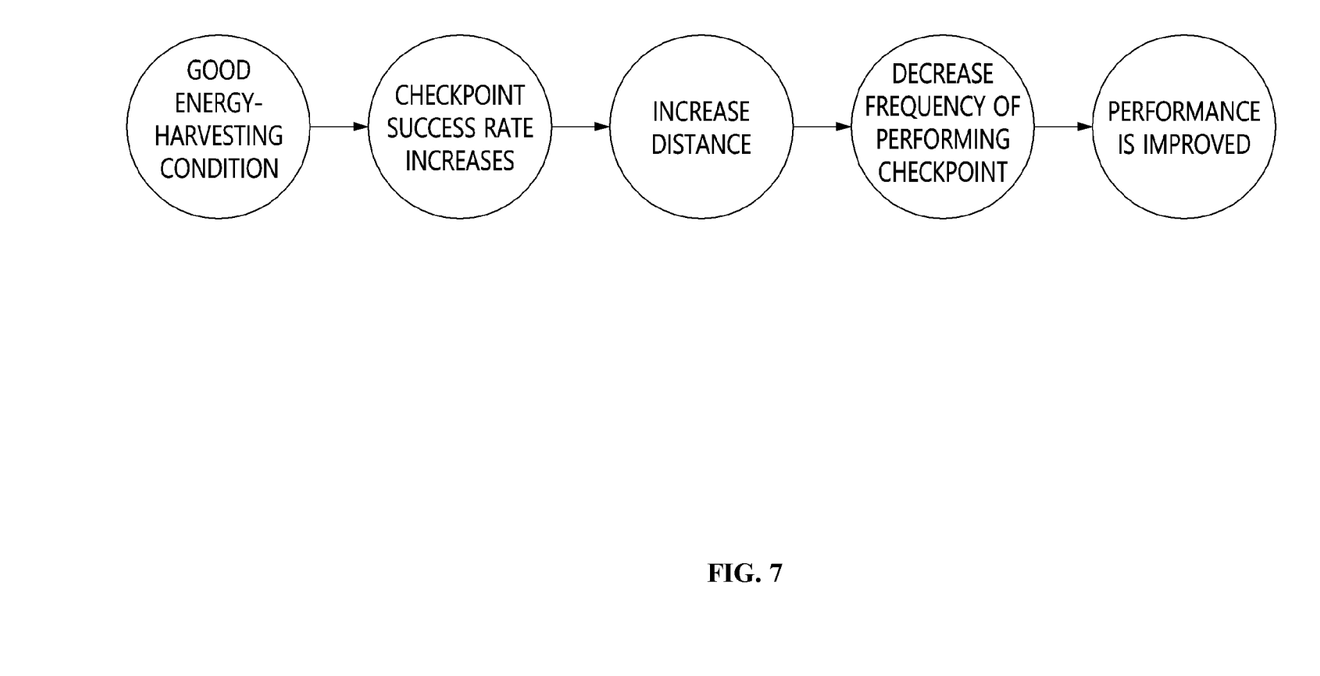
FIGS. 7 and 8 are views for explaining the effect of adaptive checkpoint technology in intermittent computing according to an embodiment.
Figure 8:
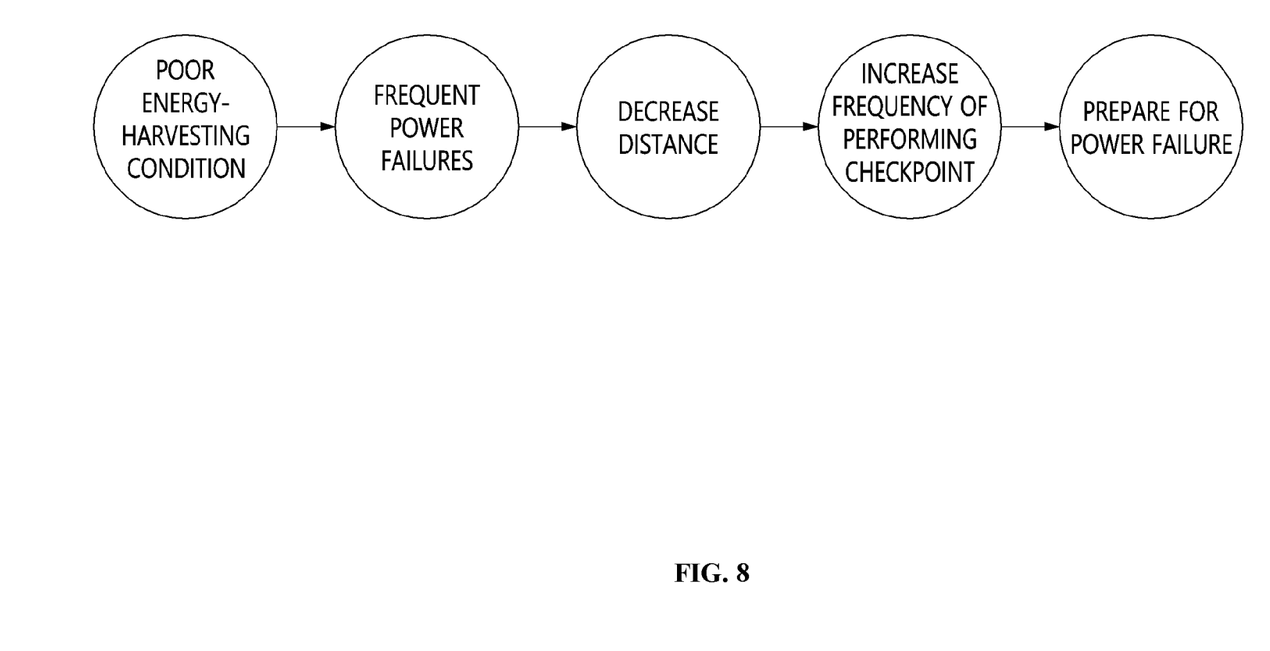

FIGS. 7 and 8 are views for explaining the effects of adaptive checkpoint technology in intermittent computing according to an embodiment.

Referring to FIG. 7, when the energy-harvesting conditions are good, a program makes further forward progress, whereby more checkpoints may be performed. Because each checkpoint increases the value of 'distance' (at S340 in FIG. 4), more and more checkpoints are skipped. Accordingly, checkpoints are seldom performed, whereby a checkpoint overhead is significantly reduced and the performance of the intermittent computing system is greatly improved.

Meanwhile, referring to FIG. 8, when the energy-harvesting conditions are not good, a power failure frequently occurs, and the value of 'distance' is decreased in the restoration process (at S440 in FIG. 5). As the value of 'distance' is decreased, a checkpoint is frequently performed, whereby it is possible to prepare for frequent power failures.

According to the disclosed embodiment, an unnecessary checkpoint overhead is minimized in intermittent computing, whereby power loss may be reduced.

According to the disclosed embodiment, a checkpoint may be performed without additional devices for measuring power in real time in intermittent computing.

According to the disclosed embodiment, atomic execution of a code region may be ensured in intermittent computing.

Although embodiments of the present disclosure have been described with reference to the accompanying drawings, those skilled in the art will appreciate that the present disclosure may be practiced in other specific forms without changing the technical spirit or essential features of the present disclosure. Therefore, the embodiments described above are illustrative in all aspects and should not be understood as limiting the present disclosure.

What is claimed is:

1. An apparatus for an adaptive checkpoint in intermittent computing, comprising:
    memory in which at least one program is recorded; and
    a processor for executing the program,
    wherein the program performs
        statically setting locations at which checkpoints are to be performed at compile time of program code, and
        dynamically determining whether to perform each checkpoint depending on energy-harvesting conditions at runtime of the program code.

2. The apparatus of claim 1, wherein, when statically setting the locations at which checkpoints are to be performed, the program sets the locations at which checkpoints are to be performed to locations outside of an atomic section.

3. The apparatus of claim 1, wherein, when dynamically determining whether to perform each checkpoint, the program determines checkpoints to be actually performed, among the checkpoints, the locations of which are set, while increasing a distance between the checkpoints to be actually performed.

4. The apparatus of claim 3, wherein, when dynamically determining whether to perform each checkpoint, the program increases the distance between the checkpoints to be actually performed by 1 whenever a checkpoint succeeds.

5. The apparatus of claim 3, wherein, when dynamically determining whether to perform each checkpoint, the program increases the distance between the checkpoints to be actually performed by a predetermined multiple of the distance whenever a checkpoint succeeds.

6. The apparatus of claim 3, wherein, when dynamically determining whether to perform each checkpoint, if the checkpoint is determined to be performed, the program stores temporary data in nonvolatile media in preparation for a power failure such that resumption at a current location is possible.

7. The apparatus of claim 3, wherein, when dynamically determining whether to perform each checkpoint, the program increases the distance between the checkpoints to be actually performed until the distance becomes a preset target, but decreases the distance between the checkpoints to be actually performed depending on current energy-harvesting conditions after power restoration if a power failure occurs before reaching a target checkpoint.

8. A method for an adaptive checkpoint in intermittent computing, comprising:
    statically setting locations at which checkpoints are to be performed at compile time of program code; and
    dynamically determining whether to perform each checkpoint depending on energy-harvesting conditions at runtime of the program code.

9. The method of claim 8, wherein statically setting the locations at which checkpoints are to be performed comprises setting the locations at which checkpoints are to be performed to locations outside of an atomic section.

10. The method of claim 8, wherein dynamically determining whether to perform each checkpoint comprises determining checkpoints to be actually performed, among the checkpoints, the locations of which are set, while increasing a distance between the checkpoints to be actually performed.

11. The method of claim 10, wherein dynamically determining whether to perform each checkpoint comprises increasing the distance between the checkpoints to be actually performed by 1 whenever a checkpoint succeeds.

12. The method of claim 10, wherein dynamically determining whether to perform each checkpoint comprises increasing the distance between the checkpoints to be actually performed by a predetermined multiple of the distance whenever a checkpoint succeeds.

13. The method of claim 10, wherein dynamically determining whether to perform each checkpoint comprises, when the checkpoint is determined to be performed, storing temporary data in nonvolatile media in preparation for a power failure such that resumption at a current location is possible.

14. The method of claim 10, wherein dynamically determining whether to perform each checkpoint comprises increasing the distance between the checkpoints to be actually performed until the distance becomes a preset target and decreasing the distance between the checkpoints to be actually performed depending on current energy-harvesting conditions after power restoration if a power failure occurs before reaching a target checkpoint.

15. An apparatus for an adaptive checkpoint in intermittent computing, comprising:
    memory in which at least one program is recorded; and
    a processor for executing the program,
    wherein the program performs dynamically determining whether to perform each checkpoint depending on energy-harvesting conditions at runtime of program code in which locations at which checkpoints are to be performed are specified.

16. The apparatus of claim 15, wherein the locations at which checkpoints are to be performed are locations outside of an atomic section.

17. The apparatus of claim 15, wherein dynamically determining whether to perform each checkpoint comprises determining checkpoints to be actually performed, among the checkpoints, the locations of which are set, while increasing a distance between the checkpoints to be actually performed.

18. The apparatus of claim 17, wherein dynamically determining whether to perform each checkpoint comprises, when the checkpoint is determined to be performed, storing temporary data in nonvolatile media in preparation for a power failure such that resumption at a current location is possible.

19. The apparatus of claim 17, wherein dynamically determining whether to perform each checkpoint comprises increasing the distance between the checkpoints to be actually performed until the distance becomes a preset target; and decreasing the distance between the checkpoints to be actually performed depending on current energy-harvesting conditions after power restoration if a power failure occurs before reaching a target checkpoint.

* * * * *